US012674273B2

(12) United States Patent
Raschka et al.

(10) Patent No.: US 12,674,273 B2
(45) Date of Patent: Jul. 7, 2026

(54) FABRIC CLEANING SYSTEMS AND METHODS USING SYNCHRONIZED CROSS-MACHINE DIRECTION TRAVERSING CLEANING HEADS

(71) Applicant: Kadant Nordic AB, Huskvarna (SE)

(72) Inventors: Werner Michael Raschka, Neuss (DE); Marcelo De Boni, Shrewsbury, MA (US)

(73) Assignee: Kadant Nordic AB, Huskvama (SE)

( * ) Notice: Subject to any disclaimer, the term of this patent is extended or adjusted under 35 U.S.C. 154(b) by 483 days.

(21) Appl. No.: 18/082,698

(22) Filed: Dec. 16, 2022

(65) Prior Publication Data

US 2023/0193554 A1 Jun. 22, 2023

Related U.S. Application Data

(60) Provisional application No. 63/337,953, filed on May 3, 2022, provisional application No. 63/331,287, filed on Apr. 15, 2022, provisional application No. 63/292,129, filed on Dec. 21, 2021.

(51) Int. Cl.

| | |
|---|---|
| ***D06G 1/00*** | (2006.01) |
| ***B08B 3/02*** | (2006.01) |
| ***B08B 5/02*** | (2006.01) |
| ***B08B 5/04*** | (2006.01) |
| ***B08B 7/04*** | (2006.01) |

(52) U.S. Cl.

CPC ............... *D06G 1/00* (2013.01); *B08B 3/022* (2013.01); *B08B 3/024* (2013.01); *B08B 5/026* (2013.01); *B08B 5/046* (2013.01); *B08B 7/04* (2013.01)

(58) Field of Classification Search

CPC ... B08B 1/20; B08B 3/022–024; B08B 3/041; B08B 5/023–026

See application file for complete search history.

(56) References Cited

U.S. PATENT DOCUMENTS 5,603,775 A * 2/1997 Sjoberg .................... D21F 1/325 15/345
5,783,044 A * 7/1998 Schneider ............ D21G 9/0063 162/278
5,916,373 A * 6/1999 Schneider ................. B08B 6/00 134/21

(Continued)

FOREIGN PATENT DOCUMENTS

DE 102005022035 A1 * 4/2006 ............. D21F 1/325
DE 102011006135 A1 * 9/2012 ........... D21G 9/0009

(Continued)

OTHER PUBLICATIONS

Extended European Search Report issued by the European Patent Office in related European Patent Application No. 22214920.5 on May 22, 2023, 7 pages.

*Primary Examiner* — Omair Chaudhri
(74) *Attorney, Agent, or Firm* — Gesmer Updegrove LLP

(57) ABSTRACT

A fabric cleaning system is disclosed that includes first and second cleaning heads on opposite sides of a fabric that travels along a machine direction, each of the first and second cleaning heads being mounted on first and second beams that extend along a cross-machine direction, and each of the first and second cleaning heads being traversable along the respective first and second beams.

24 Claims, 8 Drawing Sheets

(56) References Cited

U.S. PATENT DOCUMENTS

| | | | | | |
|---|---|---|---|---|---|
| 6,148,831 | A * | 11/2000 | Lindstrom | D21G 3/00 | 15/345 |
| 2001/0013399 | A1 * | 8/2001 | Scherb | D21F 11/006 | 162/336 |
| 2003/0094255 | A1 * | 5/2003 | Bartelmuss | D21F 1/32 | 162/275 |
| 2003/0172827 | A1 * | 9/2003 | Dohner | B65H 35/08 | 101/425 |
| 2003/0178048 | A1 * | 9/2003 | Honkala | D21F 1/325 | 134/122 R |
| 2005/0087218 | A1 * | 4/2005 | Choi | B08B 5/046 | 134/131 |
| 2006/0037169 | A1 * | 2/2006 | Sanders | B08B 3/024 | 15/302 |
| 2009/0208654 | A1 * | 8/2009 | MacFarlane | B41F 23/002 | 427/299 |
| 2012/0318472 | A1 * | 12/2012 | Caspar | D21F 1/32 | 134/122 R |
| 2013/0269734 | A1 * | 10/2013 | Hunter | B08B 11/00 | 134/32 |
| 2014/0345656 | A1 * | 11/2014 | Oh | H01L 21/67706 | 134/198 |
| 2015/0107633 | A1 * | 4/2015 | Hartwell | A61L 9/20 | 134/122 R |
| 2017/0036248 | A1 * | 2/2017 | Gross | B08B 3/022 | |
| 2017/0136511 | A1 * | 5/2017 | Blumenau | B08B 5/026 | |
| 2018/0185889 | A1 * | 7/2018 | Ishimabushi | B08B 15/04 | |
| 2021/0276053 | A1 * | 9/2021 | Bosio | B08B 5/026 | |

FOREIGN PATENT DOCUMENTS

| | | | | |
|---|---|---|---|---|
| GB | 900060 | A * | 7/1962 | B65G 45/22 |
| WO | WO-2008151814 | A1 * | 12/2008 | B08B 1/34 |
| WO | 2021163488 | A1 | 8/2021 | |

* cited by examiner

FABRIC CLEANING SYSTEMS AND METHODS USING SYNCHRONIZED CROSS-MACHINE DIRECTION TRAVERSING CLEANING HEADS

PRIORITY

The present application claims priority to U.S. Provisional Patent Application No. 63/292,129 filed Dec. 21, 2021, U.S. Provisional Patent Application No. 63/331,287 filed Apr. 15, 2022, and U.S. Provisional Patent Application No. 63/337,953 filed May 3, 2022, the disclosures of all of which are hereby incorporated by reference in their entireties.

BACKGROUND

The invention generally relates to cleaning systems, and relates in particular to cleaning head systems for use in fabric cleaning systems.

Cleaning head systems may be used in a variety of industrial applications, including for example, papermaking, tissue making, fibre mat processing (e.g., glass fibre mat), as well as many further applications involving fabrics, clothing, and other belt applications.

In a through-air-dried (TAD) tissue machine, for example, a tissue web is formed between an outer and inner fabric after which it is transferred to a TAD fabric and then to the surface of a rotating, heated dryer can. After leaving the dryer can, the TAD fabric passes through a TAD fabric cleaning station area 12 and is then treated by a release oil shower 8 as generally shown at 10 in FIG. 1. The system includes an outer fabric system 2, an inner fabric system 4, a TAD fabric system 6, a TAD fabric cleaning station area 12, and a dryer system 13. The systems include stretch rolls 1, guide rolls 3, pivot rolls 5, a head box 7 and the release oil shower 8. With reference to FIG. 2, the cleaning TAD fabric cleaning station area 12 of the TAD machine 10 of FIG. 1, includes showers shown at 14, 15, 16 and vacuum suction boxes 17, 18. In particular, the fabric engages the flooded nip shower 14, the high-pressure shower 15 on the sheet side, the high pressure shower 16 on the non-sheet side, the vacuum box 17 on the sheet side, and the vacuum box 18 on the non-sheet side. The systems, including those in the cleaning area, are provided in the full cross-machine direction, and their use involves not insubstantial water and energy consumption.

There remains a need therefore for more efficient and more economical cleaning systems for use in fabric cleaning systems.

SUMMARY

In accordance with an aspect, the invention provides a fabric cleaning system including first and second cleaning heads on opposite sides of a fabric that travels along a machine direction, each of the first and second cleaning heads being mounted on first and second beams that extend along a cross-machine direction, and each of the first and second cleaning heads being traversable along the respective first and second beams.

In accordance with another aspect, the invention provides a method of cleaning fabric including providing first and second cleaning heads on opposite sides of a fabric, moving the fabric along a machine direction, and traversing each of the first and second cleaning heads along respective first and second beams during cleaning.

In accordance with a further aspect, the invention provides a fabric cleaning system comprising for use in a roll processing system. The fabric cleaning system includes a first traversing cleaning head that is directed toward a sheet side of a fabric, said first traversing cleaning head being adapted to traverse a cross-machine direction of the fabric, and a second traversing cleaning head that is directed toward a roll side of the fabric that is opposite the sheet side of the fabric, said second traversing cleaning head also being adapted to traverse the cross-machine direction of the fabric.

BRIEF DESCRIPTION OF THE DRAWINGS

The following description may be further understood with reference to the accompanying drawings in which.

The drawings are shown for illustrative purposes only.

DETAILED DESCRIPTION

In accordance with various aspects, the invention provides an improved dual-beam, traversing shower cleaning concept to simultaneously clean both the product (sheet side) and roll side of machine fabrics typically used in paper, tissue, and non-woven materials (such as glass mat) manufacturing processes. This new cleaning concept utilizes two synchronized, traversing cleaning heads: one from the sheet-side and one from the roll side. The traversing cleaning head assembly of the sheet side beam that contains spray nozzles and a two-zone vacuum hood (one for the evacuation of the flooded nip water and one for the evacuation of the cleaning water). The traversing cleaning head of the roll side beam contains a spray nozzle for flooding the nip between the fabric and the roll and an additional trailing air-doctor or Uhle (vacuum) box, after the fabric has left the roll, to ensure maximum dryness of the fabric as it exits the cleaning zone and thus eliminating the need for a conventional full-width Uhle box or full-width air knife.

This new cleaning concept is an improvement over the prior art as it will help to reduce the usage of valuable resources such as water and energy. The invention also provides savings by reducing the consumption of cleaning chemistries/agents and by optimizing the performance of and extending the life of machine fabrics-thereby reducing the number of fabrics consumed over a given time-period. In addition to those applications mentioned above, this cleaning concept could be used in many other manufacturing processes where contamination needs to be removed from a machine fabric, conveyor belt or web conveying rolls.

Figure 1:
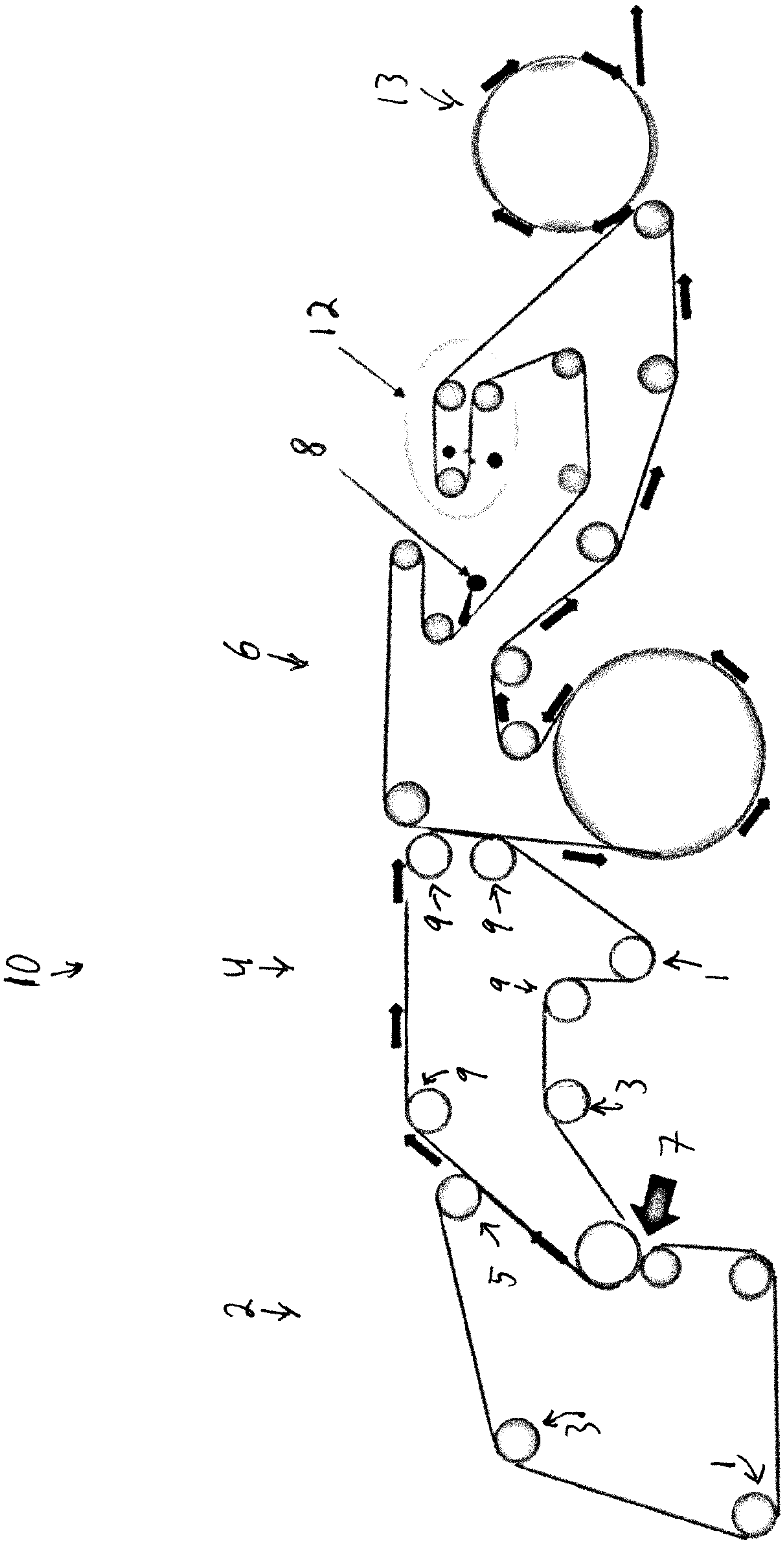
FIG. 1 (PRIOR ART)
FIG. 1 shows an illustrative diagrammatic view of a through-air-dried tissue machine of the prior art.
Figure 2:
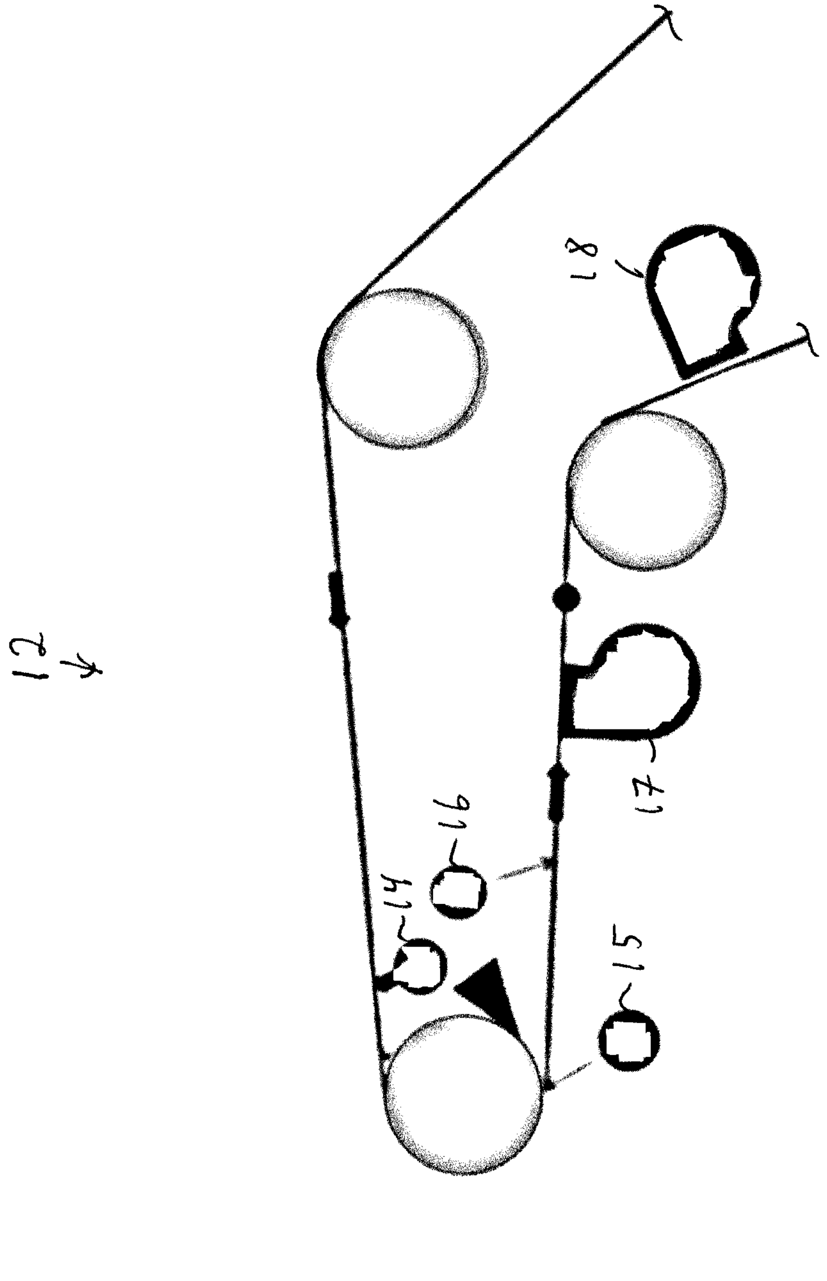
FIG. 2 (PRIOR ART)
FIG. 2 shows an illustrative diagrammatic view of the cleaning station area in the tissue machine of FIG. 1.
Figure 3:
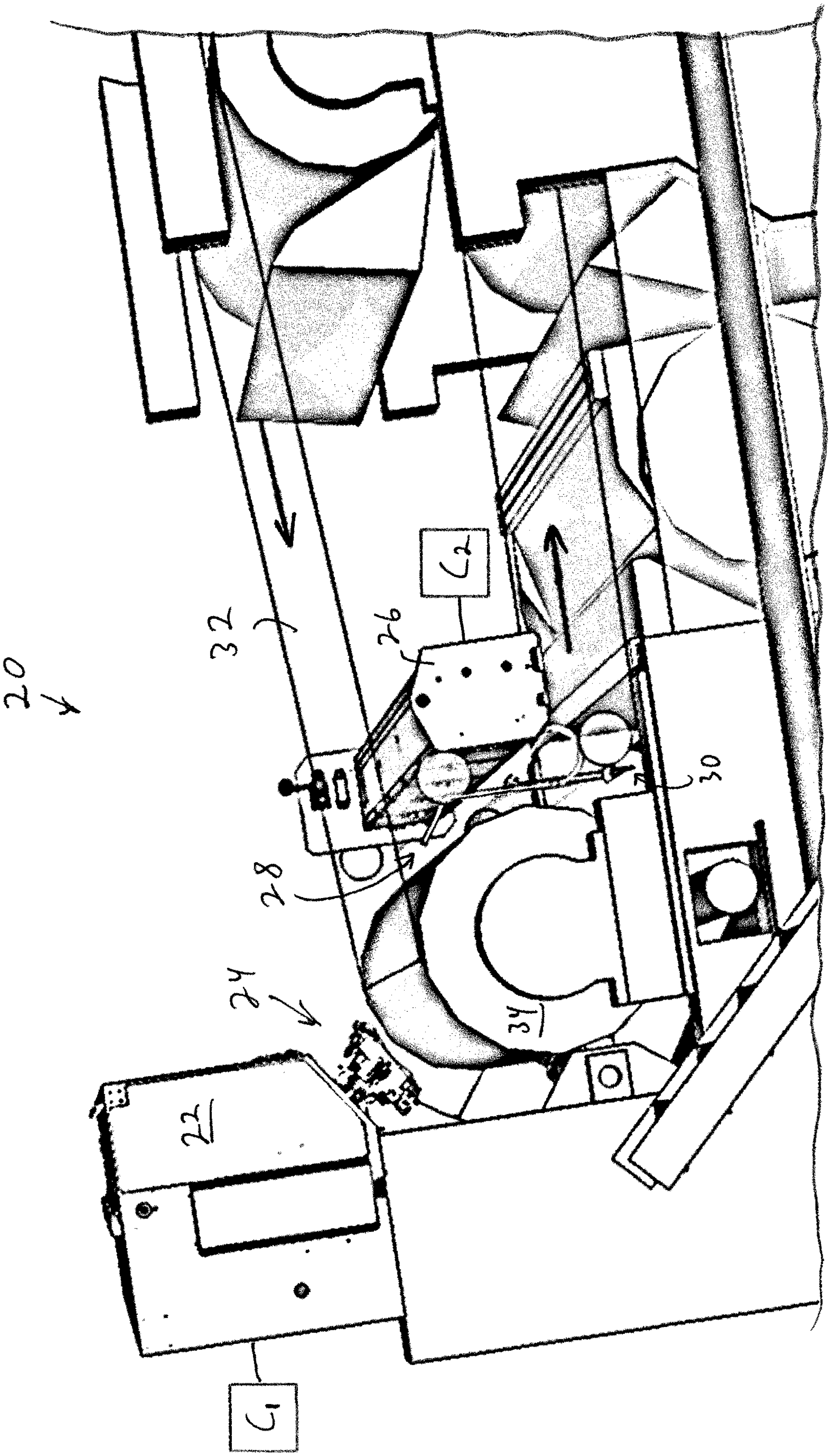
FIG. 3 shows an illustrative diagrammatic view of a fabric cleaning system in accordance with an aspect of the present invention that includes a dual beam traversing cleaning system.

FIG. 3, for example, shows at 20 a dual beam cleaning system in accordance with an aspect of the present invention. The system 20 includes a first traversing cleaning head 24 that travels along a first beam 22, and a second traversing cleaning head 28 provides fluid under high pressure (e.g., water), and travels along a second beam 26. The second traversing cleaning head also includes an air-doctor or a vacuum box 30 for removing any remaining water from the fabric 32 after leaving the roll 34. Movement of the cleaning heads 24, 28 is synchronized, e.g., via synchronizing controllers $C_1$ and $C_2$, or via mechanical synchronization. The synchronization ensures that each cleaning head 24, 28 is positioned on opposite sides of the same area of the fabric 32 at all times.

Figure 4:
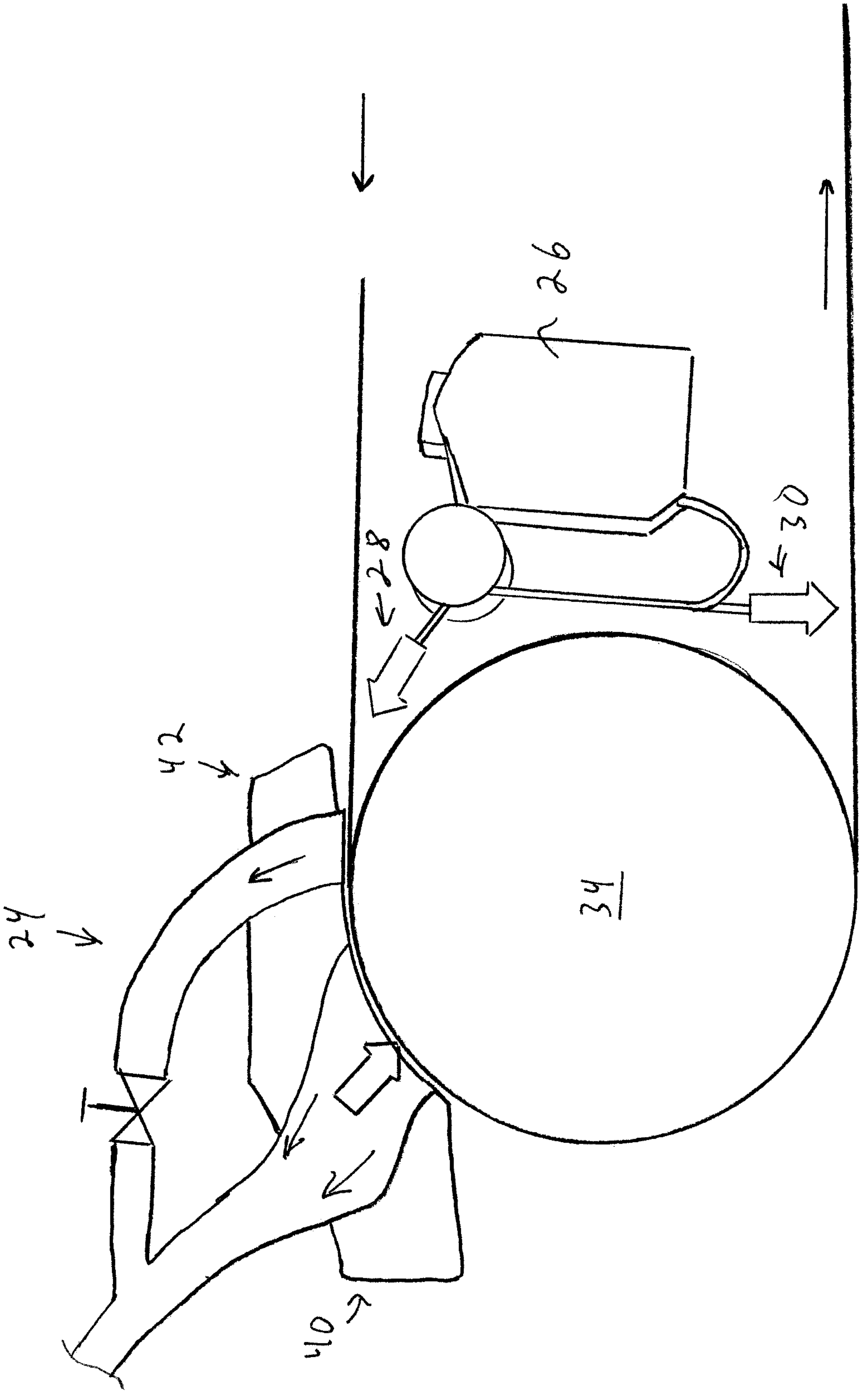
FIG. 4 shows an illustrative diagrammatic enlarged view of the first and second traversing cleaning heads of FIG. 3.

The first traversing cleaning head 24 includes a first area 40 that provides fluid under high pressure (e.g., water) application as well as vacuum, and a second area 42 that provides vacuum as shown in FIG. 4. The second traversing cleaning head 28 provides fluid under pressure (e.g., water). The application of the water under pressure against the roll side of the fabric 32 is applied to the same position of the fabric as the application of the vacuum at the second area 42 on the sheet side of the fabric 32. As the cleaning heads 24, 28 move along their respective beams 22, 26 in the cross-machine direction, their movements are synchronized with one another to permit the vacuum at 42 to cooperate with the fluid under pressure at the applicable flooded region of the nip. Generally, the cleaning head 24 cleans from the sheet side through the fabric 32, cleaning head 28 cleans from the roll side of the fabric, and air-doctor 30 blows, or vacuum box sucks out remaining water from the roll side following the roll 34.

Figure 5:
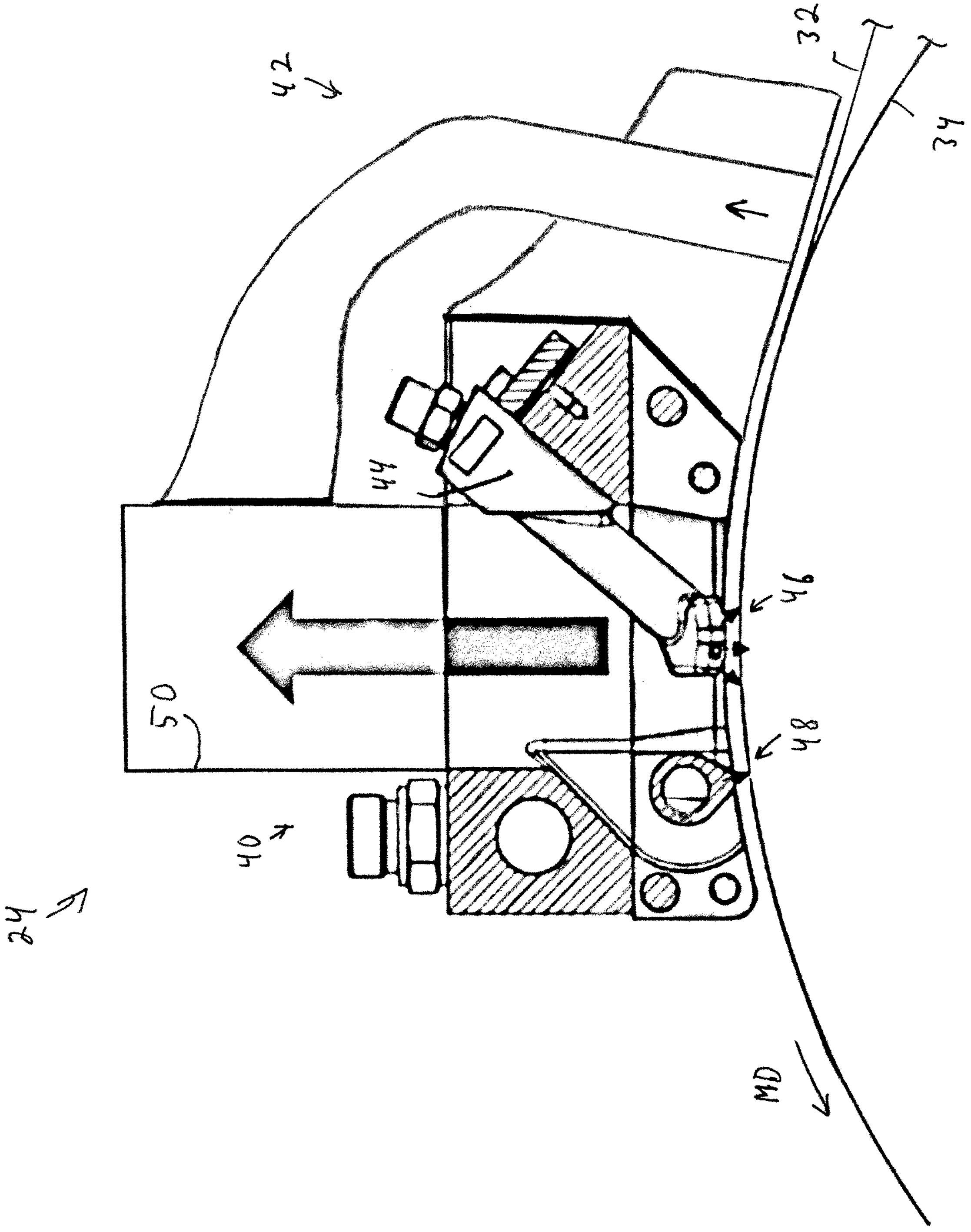
FIG. 5 shows an illustrative diagrammatic enlarged side view of the first traversing cleaning head of FIG. 4.
Figure 6:
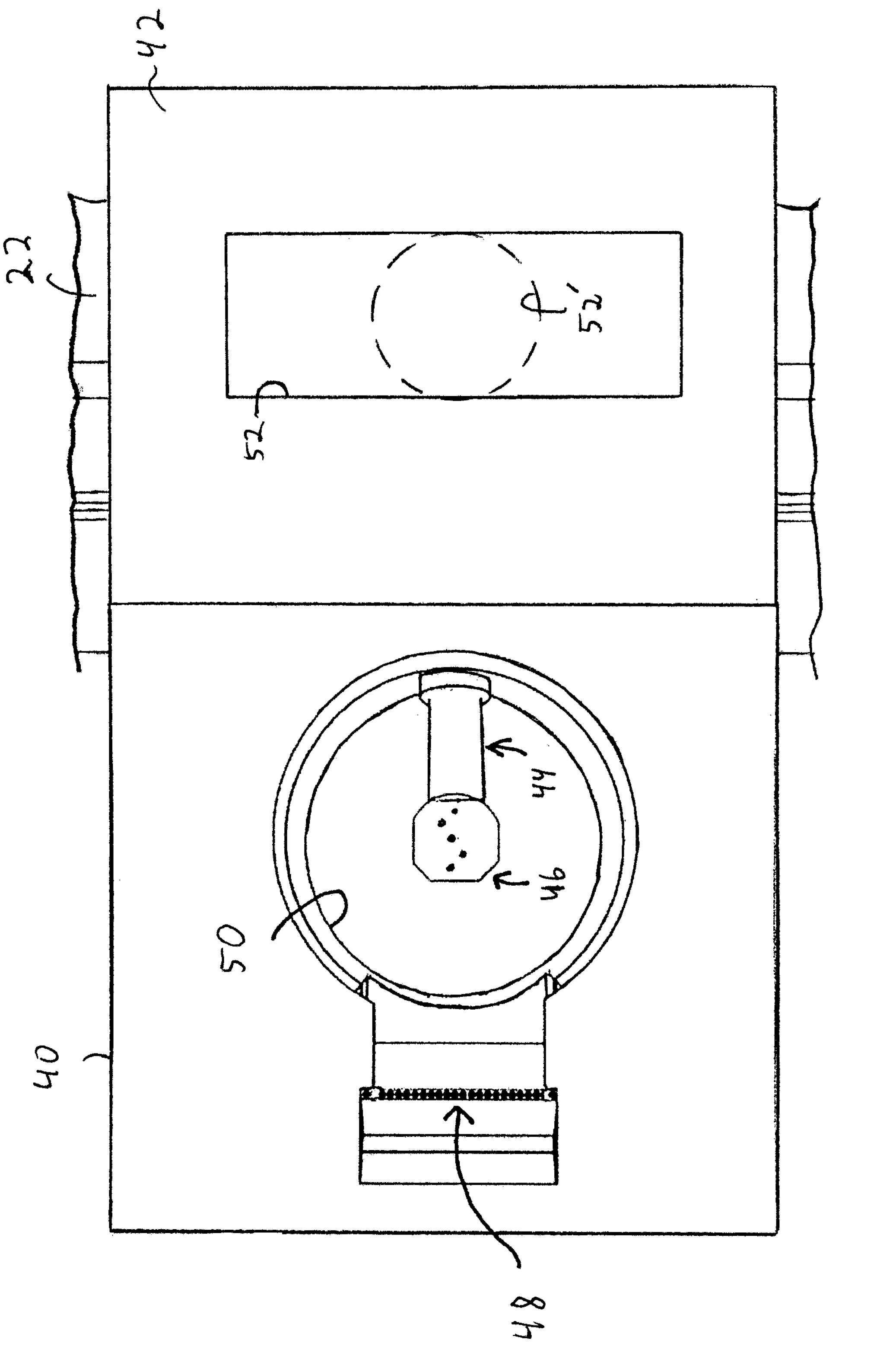
FIG. 6 shows an illustrative diagrammatic underside view of the portion of the first traversing cleaning head of FIG. 5 facing the fabric surface.

FIG. 5 shows an enlarged view of the first traversing cleaning head 24, and FIG. 6 shows an underside view of the first traversing cleaning head shown in FIG. 5. The traversing cleaning head 24 with removable nozzle body is mounted on a rail 22 traversing the surface which is to be cleaned. The number of spray nozzles utilized can be varied and is determined based on the width of the machine and desired traversing speed. The nozzle spray angle and orifice diameter can also vary and is determined based on the application needs. As shown in FIGS. 5 and 6, the area 40 includes a nozzle body 44 with a plurality of nozzles 46 at an end thereof that provide fluid (e.g., water) under pressure to the sheet surface of the fabric. Positive air pressure may also be provided by an air knife as shown at 48 that may be provided as directed to the surface being cleaned (air flow may be directed at inward angles). Vacuum is provided at area 40 through conduit 50 that surrounds the nozzle body end, and this vacuum is used to remove as much water as possible that is in the fabric or sprayed away from the fabric, as well as to collect the contaminants and fibres. As also shown in FIG. 6, the area 42 includes a vacuum opening, which could be rectangular as shown at 52 or round as shown at 52', through which additional vacuum is provided on the sheet side of the fabric opposite the roller nip, to collect out-bursting water from the cleaning head 28.

Figure 7:
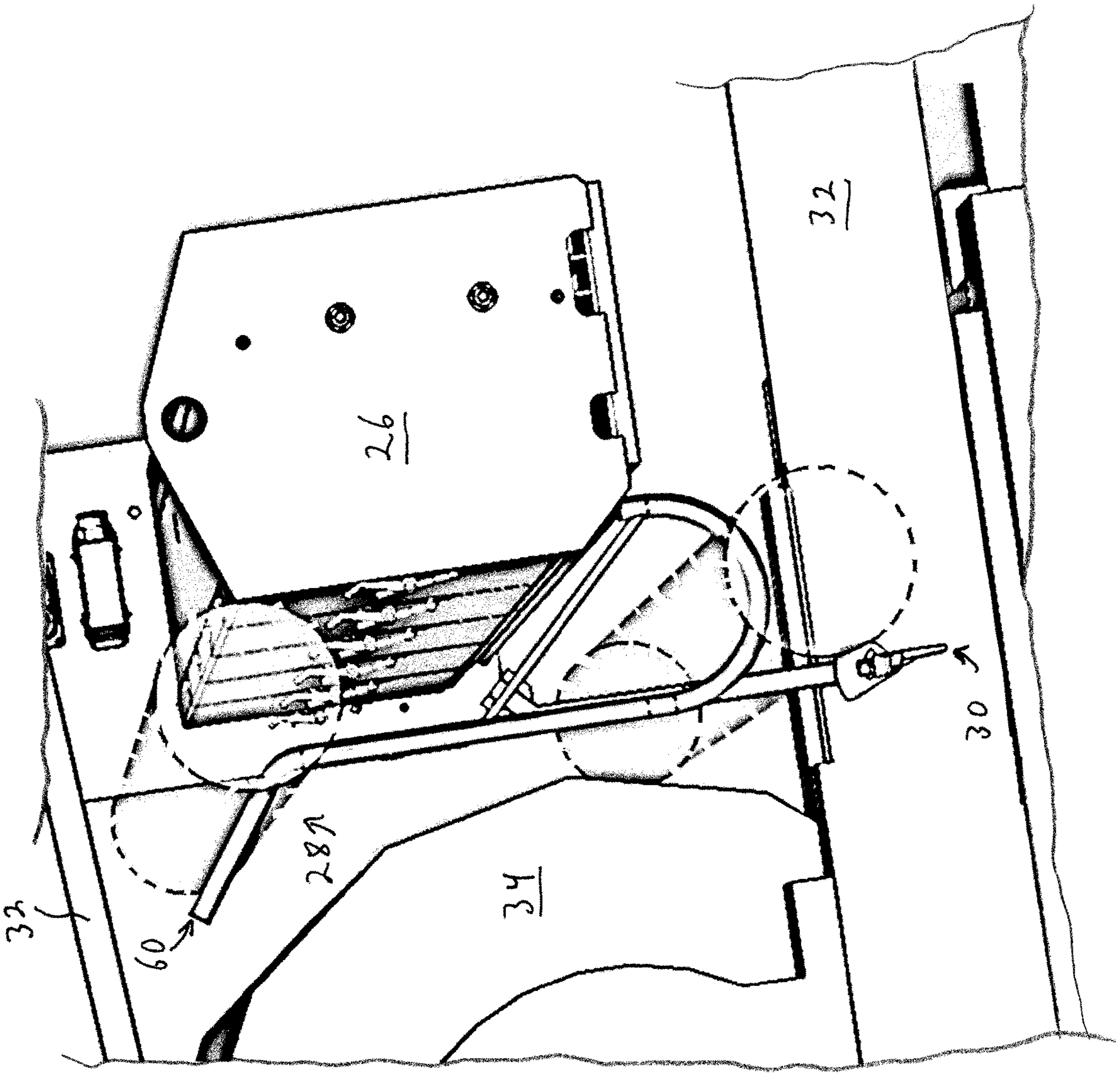
FIG. 7 shows an illustrative diagrammatic enlarged view of the second traversing cleaning head of FIG. 3.

With reference to FIG. 7, the second traversing cleaning head 28 includes nozzles 60 for flooding the roll side of the roller nip (and directly opposite the vacuum opening 52 on the opposite side of the fabric 32). The flooded nip cleaning head 28 with removable nozzle body is mounted on a rail traversing the surface which is to be cleaned. Both beams 22, 26 track to the same position. The traversing cleaning heads are synchronized through mechanical (cardan drive) or electronic coupling. The number of nozzles is related to the parameters of the machine, like width, speed. The flooded nip nozzle spray angle and orifice diameter can also vary and is determined based on the application needs. Additional cleaning fluids may also be provided at the roll nip as required during machine cleaning.

Figure 8:
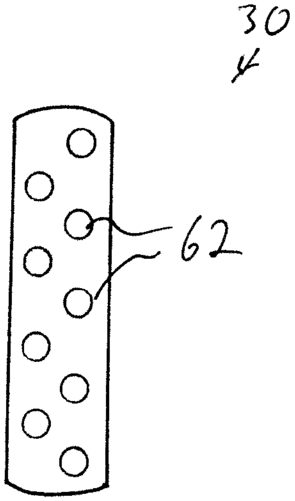
FIG. 8 shows an illustrative diagrammatic underside view of the nozzle apertures in the second traversing cleaning head facing the fabric surface in accordance with an aspect of the present invention including a plurality of apertures.
Figure 9:
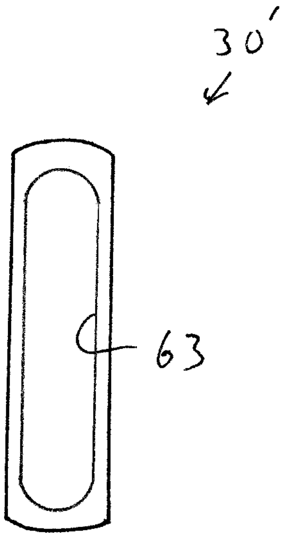
FIG. 9 shows an illustrative diagrammatic underside view of the nozzle aperture in the second traversing cleaning head facing the fabric surface in accordance with an aspect of the present invention including a single enlarged aperture.

The cleaning head 28 also includes an air knife 30 that applies forced air or vacuum to the roll side of the fabric 32 following the roll 34. FIG. 8 shows an underside of the air knife or vacuum slot 30, which includes a plurality of apertures 62 (e.g., two rows of apertures extending in the cross-machine direction) as shown in FIG. 8 or a vacuum slot 63 in an air knife or vacuum slot 30' as shown in FIG. 9 based on the particular application and web speed. In other applications, apertures may extend in the machine direction. The air-doctor 30 after the fabric has left the roll is also aligned at the same position as the cleaning head and flooded nip head.

Those skill in the art will appreciate that numerous modifications and variations may be made to the above disclosed embodiments without departing from the spirit and scope of the present invention.

What is claimed is:

1. A fabric cleaning system comprising:

a first cleaning head and a second cleaning head disposed on opposite sides of a fabric that travels along a machine direction partially around a roll, each of the first and second cleaning heads being mounted on first and second beams that extend along a cross-machine direction, and each of the first and second cleaning heads being traversable along the respective first and second beams, the first cleaning head including a first area and a second area, the first area of the first cleaning head providing a fluid under positive pressure and a vacuum against a sheet side of the fabric, the second area of the first cleaning head providing a further vacuum on the sheet side of the fabric, and the second cleaning head providing a fluid under pressure against a roll side of the fabric, wherein the second cleaning head applies the fluid under pressure to a same position of the fabric at which the second area of the first cleaning head applies the further vacuum on the sheet side of the fabric, wherein the second cleaning head further includes an air-doctor for applying air under positive pressure that removes any remaining fluid from the roll side of the fabric following the roll away from the first cleaning head.

2. The fabric cleaning system as claimed in claim 1, wherein movement of the first and second cleaning heads along the first and second beams respectively is synchronized with one another.

3. The fabric cleaning system as claimed in claim 1, wherein the second area of the first cleaning head follows the first area of the first cleaning head in the machine direction.

4. The fabric cleaning system as claimed in claim 1, wherein the second cleaning head includes a nozzle for providing the fluid under positive pressure to a roll nip.

5. A method of cleaning fabric comprising:

providing a first cleaning head and a second cleaning head disposed on opposite sides of a fabric;

moving the fabric along a machine direction partially around a roll; and traversing each of the first cleaning head and the second cleaning head along respective first and second beams during cleaning in a cross-machine direction, the first cleaning head including a first area and a second area, the first area of the first cleaning head providing a fluid under positive pressure and a vacuum against a sheet side of the fabric, the second area of the first cleaning head providing a further vacuum on the sheet side of the fabric, and the second cleaning head providing a fluid under pressure against a roll side of the fabric, wherein the second cleaning head applies the fluid under pressure to a same position of the fabric at which the second area of the first cleaning head applies the further vacuum on the sheet side of the fabric, wherein the second cleaning head further includes an air-doctor for applying air under positive pressure that removes any remaining fluid from the roll side of the fabric following the roll away from the first cleaning head.

6. The method as claimed in claim 5, wherein movement of the first and second cleaning heads along the first and second beams respectively is synchronized with one another.

7. The method as claimed in claim 5, wherein the second area of the first cleaning head follows the first area of the first cleaning head in the machine direction.

8. The method as claimed in claim 5, wherein the second cleaning head includes a nozzle for providing the fluid under positive pressure to a roll nip.

9. A fabric cleaning system comprising for use in a roll processing system, said fabric cleaning system comprising:

a first traversing cleaning head that is directed toward a sheet side of a fabric that travels along a machine direction partially around a roll, said first traversing cleaning head being adapted to traverse a cross-machine direction of the fabric; and a second traversing cleaning head that is directed toward a roll side of the fabric that is opposite the sheet side of the fabric, said second traversing cleaning head also being adapted to traverse the cross-machine direction of the fabric, the first traversing cleaning head including a first area and a second area, the first area of the first traversing cleaning head comprising a first plurality of nozzles surrounded by a first vacuum opening that provide a fluid under positive pressure and a vacuum towards a sheet side of the fabric, the first area of the first traversing cleaning head further comprising an air-doctor that provides positive air pressure to the sheet side of the fabric, the second area of the first traversing cleaning head comprising a second vacuum opening that provides a further vacuum on the sheet side of the fabric, and the second traversing cleaning head comprising a second plurality of nozzles that faces the second vacuum opening of the first cleaning head and provides a fluid under positive pressure towards a roll side of the fabric, wherein the second traversing cleaning head further includes an air-doctor for applying air under positive pressure that removes any remaining fluid from the roll side of the fabric following the roll away from the first traversing cleaning head.

10. The fabric cleaning system as claimed in claim 9, wherein the first traversing cleaning head and the second traversing cleaning head are synchronized to traverse in the cross-machine direction together.

11. The fabric cleaning system as claimed in claim 9, wherein the fluid under positive pressure provided by the first plurality of nozzles of the first traversing cleaning head against the sheet side of the fabric includes a liquid.

12. The fabric cleaning system as claimed in claim 9, wherein the fluid under pressure provided by the second traversing cleaning head against the roll side of the fabric includes a liquid under positive pressure applied to the roll side of the fabric at a same position of the fabric at which the second area of the first traversing cleaning head applies the vacuum on the sheet side of the fabric.

13. A fabric cleaning system comprising:

a first cleaning head and a second cleaning head disposed on opposite sides of a fabric that travels along a machine direction partially around a roll, each of the first and second cleaning heads being mounted on first and second beams that extend along a cross-machine direction, and each of the first and second cleaning heads being traversable along the respective first and second beams, the first cleaning head including a first area and a second area, the first area of the first cleaning head providing a fluid under positive pressure and a vacuum against a sheet side of the fabric, the second area of the first cleaning head providing a further vacuum on the sheet side of the fabric, and the second cleaning head providing a fluid under pressure against a roll side of the fabric, wherein the second cleaning head applies the fluid under pressure to a same position of the fabric at which the second area of the first cleaning head applies the further vacuum on the sheet side of the fabric, wherein the second cleaning head further includes a vacuum box that removes any remaining fluid from the roll side of the fabric following the roll away from the first cleaning head.

14. The fabric cleaning system as claimed in claim 13, wherein movement of the first and second cleaning heads along the first and second beams respectively is synchronized with one another.

15. The fabric cleaning system as claimed in claim 13, wherein the second area of the first cleaning head follows the first area of the first cleaning head in the machine direction.

16. The fabric cleaning system as claimed in claim 13, wherein the second cleaning head includes a nozzle for providing the fluid under positive pressure to a roll nip.

17. A method of cleaning fabric comprising:

providing a first cleaning head and a second cleaning head disposed on opposite sides of a fabric;

moving the fabric along a machine direction partially around a roll; and traversing each of the first cleaning head and the second cleaning head along respective first and second beams during cleaning in a cross-machine direction, the first cleaning head including a first area and a second area, the first area of the first cleaning head providing a fluid under positive pressure and a vacuum against a sheet side of the fabric, the second area of the first cleaning head providing a further vacuum on the sheet side of the fabric, and the second cleaning head providing a fluid under pressure against a roll side of the fabric, wherein the second cleaning head applies the fluid under pressure to a same position of the fabric at which the second area of the first cleaning head applies the further vacuum on the sheet side of the fabric, wherein the second cleaning head further includes a vacuum box that removes any remaining fluid from the roll side of the fabric following the roll away from the first cleaning head.

18. The method as claimed in claim 17, wherein movement of the first and second cleaning heads along the first and second beams respectively is synchronized with one another.

19. The method as claimed in claim 17, wherein the second area of the first cleaning head follows the first area of the first cleaning head in the machine direction.

20. The method as claimed in claim 17, wherein the second cleaning head includes a nozzle for providing the fluid under positive pressure to a roll nip.

21. A fabric cleaning system comprising for use in a roll processing system, said fabric cleaning system comprising:

a first traversing cleaning head that is directed toward a sheet side of a fabric that travels along a machine direction partially around a roll, said first traversing cleaning head being adapted to traverse a cross-machine direction of the fabric; and a second traversing cleaning head that is directed toward a roll side of the fabric that is opposite the sheet side of the fabric, said second traversing cleaning head also being adapted to traverse the cross-machine direction of the fabric, the first traversing cleaning head including a first area and a second area, the first area of the first traversing cleaning head comprising a first plurality of nozzles surrounded by a first vacuum opening that provide a fluid under positive pressure and a vacuum towards a sheet side of the fabric, the first area of the first traversing cleaning head further comprising an air-doctor that provides positive air pressure to the sheet side of the fabric, the second area of the first traversing cleaning head comprising a second vacuum opening that provides a further vacuum on the sheet side of the fabric, and the second traversing cleaning head comprising a second plurality of nozzles that faces the second vacuum opening of the first cleaning head and provides a fluid under positive pressure towards a roll side of the fabric, wherein the second traversing cleaning head further includes a vacuum box that removes any remaining fluid from the roll side of the fabric following the roll away from the first traversing cleaning head.

22. The fabric cleaning system as claimed in claim 21, wherein the first traversing cleaning head and the second traversing cleaning head are synchronized to traverse in the cross-machine direction together.

23. The fabric cleaning system as claimed in claim 21, wherein the fluid under positive pressure provided by the first plurality of nozzles of the first traversing cleaning head against the sheet side of the fabric includes a liquid.

24. The fabric cleaning system as claimed in claim 21, wherein the fluid under pressure provided by the second traversing cleaning head against the roll side of the fabric includes a liquid under positive pressure applied to the roll side of the fabric at a same position of the fabric at which the second area of the first traversing cleaning head applies the vacuum on the sheet side of the fabric.

* * * * *